(12) United States Patent
Lindsay (10) Patent No.: US 7,762,604 B1
(45) Date of Patent: Jul. 27, 2010

(54) VEHICLE SEATING ARRANGEMENT

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/389,827

(22) Filed: Feb. 20, 2009

(51) Int. Cl.
*B60N 2/12* (2006.01)
*B60N 2/22* (2006.01)

(52) U.S. Cl. .................. 296/64; 296/65.05; 296/65.09; 296/65.16; 297/378.13

(58) Field of Classification Search .................. 296/64, 296/65.05, 65.09, 65.16, 65.01, 65.03; 297/378.13, 297/378.1, 378.12; 292/216
See application file for complete search history.

(56) References Cited

U.S. PATENT DOCUMENTS

| | | | | |
|---|---|---|---|---|
| 6,000,742 | A * | 12/1999 | Schaefer et al. | 296/65.09 |
| 6,234,553 | B1 * | 5/2001 | Eschelbach et al. | 296/65.14 |
| 6,321,055 | B1 * | 11/2001 | Mashtare et al. | 399/266 |
| 6,595,588 | B2 * | 7/2003 | Ellerich et al. | 297/331 |
| 6,648,392 | B2 * | 11/2003 | Fourrey et al. | 296/65.09 |
| 6,733,078 | B1 * | 5/2004 | Zelmanov | 297/378.13 |
| 6,769,741 | B2 * | 8/2004 | Denning | 297/378.13 |
| 6,981,744 | B2 * | 1/2006 | Elterman et al. | 297/336 |
| 7,377,584 | B2 * | 5/2008 | Griswold et al. | 297/216.12 |
| 7,404,605 | B2 * | 7/2008 | Inoue et al. | 297/378.13 |
| 7,410,217 | B2 * | 8/2008 | Inoue et al. | 297/378.13 |
| 7,494,187 | B2 * | 2/2009 | Inoue et al. | 297/378.13 |
| 2007/0085368 | A1 * | 4/2007 | Hirokawa et al. | 296/65.16 |

\* cited by examiner

*Primary Examiner*—Glenn Dayoan
*Assistant Examiner*—Gregory Blankenship
(74) *Attorney, Agent, or Firm*—Rankin, Hill & Clark, LLP (57) ABSTRACT

A vehicle seating arrangement adapted for use in connection with a vehicle having an increased cargo and/or passenger carrying capacity is provided. The vehicle seating arrangement comprises a front or first row seat coupled to a vehicle body, a second row seat and a rear or third row seat coupled to the vehicle body. The second row seat includes a seat cushion for supporting a seat occupant and a seat back pivotally coupled to the seat cushion. The seat cushion is pivotally coupled to the vehicle body. The seat back has one of a first striker and a first latch mechanism and the vehicle body has the other of the first striker and the first latch mechanism. The third row seat includes a seat cushion affixed to the vehicle body for supporting a seat occupant, and a seat back pivotally coupled to the seat cushion. The seat back has one of a second striker and a second latch mechanism and the vehicle body has the other of the second striker and the second latch mechanism.

20 Claims, 9 Drawing Sheets

VEHICLE SEATING ARRANGEMENT

BACKGROUND

The present disclosure generally relates to vehicle seats and seating arrangements, and more particularly to a vehicle seating arrangement adapted for use in connection with vehicles having an increased cargo and/or passenger carrying capacity, such as station wagons, sport utility vehicles, vans and the like.

It is increasingly desirable that a vehicle be capable of accommodating varying requirements, such as cargo carrying, occupant comfort and the like. It is well known in the art to provide folding seat backs to allow access to the cargo storage area through the opening in the partition between the passenger area and the cargo storage area of a vehicle (e.g., in sedans or coupes having a trunk compartment). It is also known to provide folding seat backs to allow access to areas behind a vehicle seat such as for a second and third row seat (e.g., in a sport utility vehicle or minivan).

Articulation of a seatback enables a vehicle interior to be configurable for accommodating various cargo-carrying needs and to provide improved occupant comfort. Latching mechanisms are often used to selectively anchor a seatback to a stationary striker attached to the vehicle body, thereby securing the seatback to a vehicle structure in an upright, or designed seating position. The seat back can also include a recliner pivot located between the seat back and seat base. The seatback can also be folded to provide access.

Many conventional latching mechanisms suffer from the disadvantage that they only allow for the seatback to be latched in a single position, thereby hampering occupant comfort. Other conventional seating systems that have a range of adjustment for a seatback relative a seat bottom employ a plurality of strikers. In this system, the latch mechanism is typically required to have a relatively large body to accommodate each striker passing through the body of the latch mechanism as the mechanism is moved between each individual striker. Further, prior art seating systems are sometimes difficult to manufacture due to complex parts and/or configurations which can increase costs.

BRIEF DESCRIPTION

In accordance with one aspect, a vehicle seating arrangement adapted for use in connection with a vehicle having an increased cargo and/or passenger carrying capacity is provided. The vehicle seating arrangement comprises at least one front or first row seat assembly coupled to a vehicle body, at least one second row seat assembly, and at least one rear or third row seat assembly coupled to the vehicle body. The at least one second row seat assembly includes a seat cushion for supporting a seat occupant and a seat back pivotally coupled to the seat cushion. The seat cushion is pivotally coupled to the vehicle body. A high latch assembly is operatively associated with the at least one second row seat assembly. The high latch assembly includes a housing having a dual-arc guide configured to allow for both ingress to and egress from the at least one third row seat assembly and recline adjustment of the seat back.

In accordance with another aspect, a high latch assembly for a vehicle seat is provided. The vehicle seat includes a seat cushion for supporting a seat occupant. The seat cushion is pivotally coupled to a vehicle body. A seat back is pivotally coupled to the seat cushion and is movable between an upright position and a recline position. The high latch assembly comprises a housing adapted to receive a striker affixed to a vehicle wall. The housing includes a first arcuate guide portion configured to allow the seat to pivot forward and a second arcuate guide portion configured to allow the seat back to move between the upright position and the recline position. A first seat pivot of the first arcuate guide portion is offset from a second seat pivot of the second arcuate guide portion In accordance with yet another aspect, a vehicle seating arrangement adapted for use in connection with a vehicle having an increased cargo and/or passenger carrying capacity is provided. The vehicle seating arrangement comprises a front or first row seat coupled to a vehicle body, a second row seat and a rear or third row seat coupled to the vehicle body. The second row seat includes a seat cushion for supporting a seat occupant and a seat back pivotally coupled to the seat cushion. The seat cushion is pivotally coupled to the vehicle body. The seat back has one of a first striker and a first latch mechanism and the vehicle body has the other of the first striker and the first latch mechanism. The third row seat includes a seat cushion affixed to the vehicle body for supporting a seat occupant, and a seat back pivotally coupled to the seat cushion. The seat back has one of a second striker and a second latch mechanism and the vehicle body has the other of the second striker and the second latch mechanism.

DETAILED DESCRIPTION

It should, of course, be understood that the description and drawings herein are merely illustrative and that various modifications and changes can be made in the structures disclosed without departing from the present disclosure. It will also be appreciated that the various identified components of the vehicle seating arrangement disclosed herein are merely terms of art that may vary from one vehicle manufacturer to another and should not be deemed to limit the present disclosure. All references to direction and position, unless otherwise indicated, refer to the orientation of the vehicle seating arrangement device illustrated in the drawings and should not be construed as limiting the claims appended hereto. Like numerals refer to like parts throughout the several views.

Figure 1:
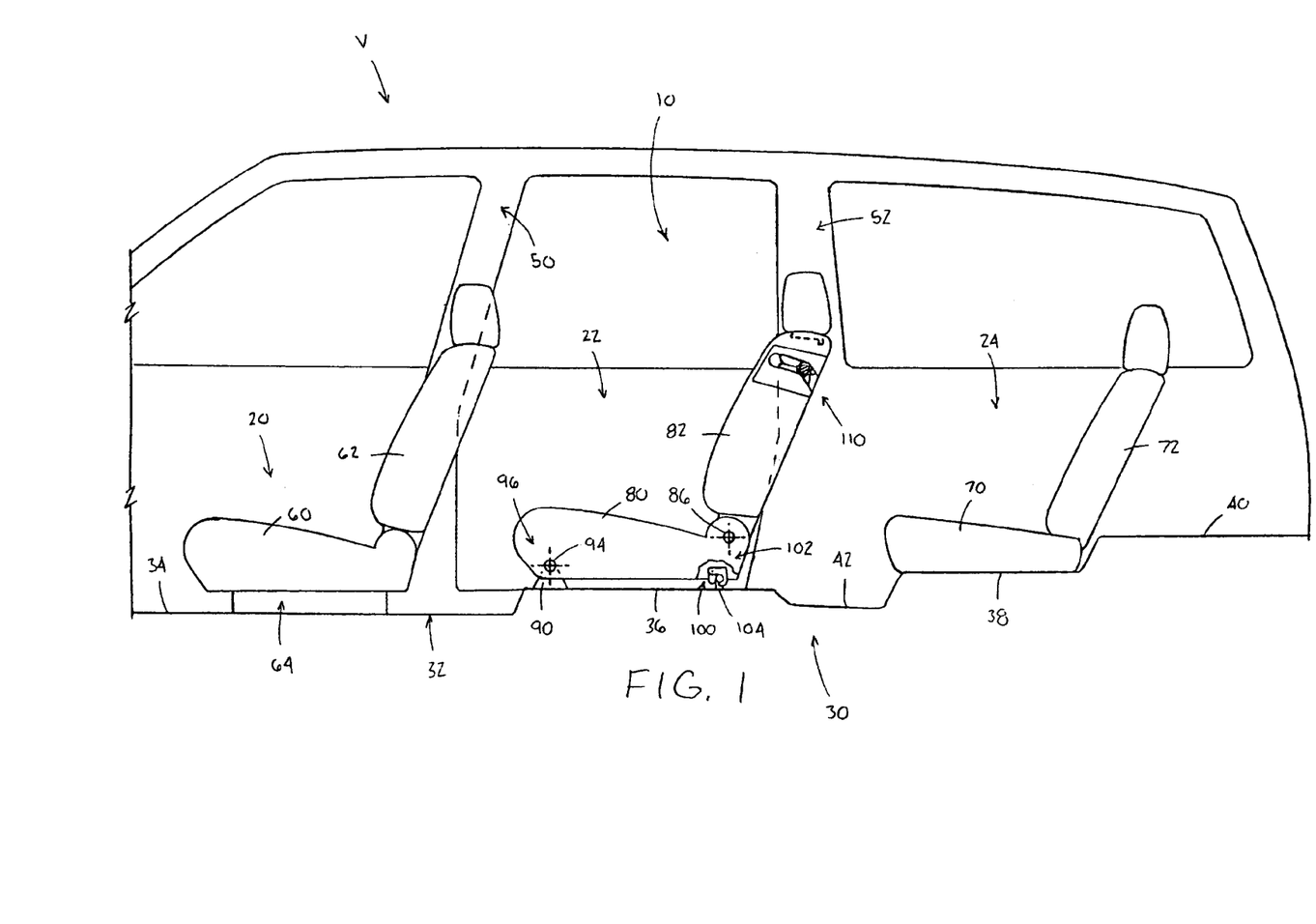
FIG. 1 schematically illustrates an exemplary embodiment of a vehicle seating arrangement including a second row seat shown in a first, upright position.
Figure 2:
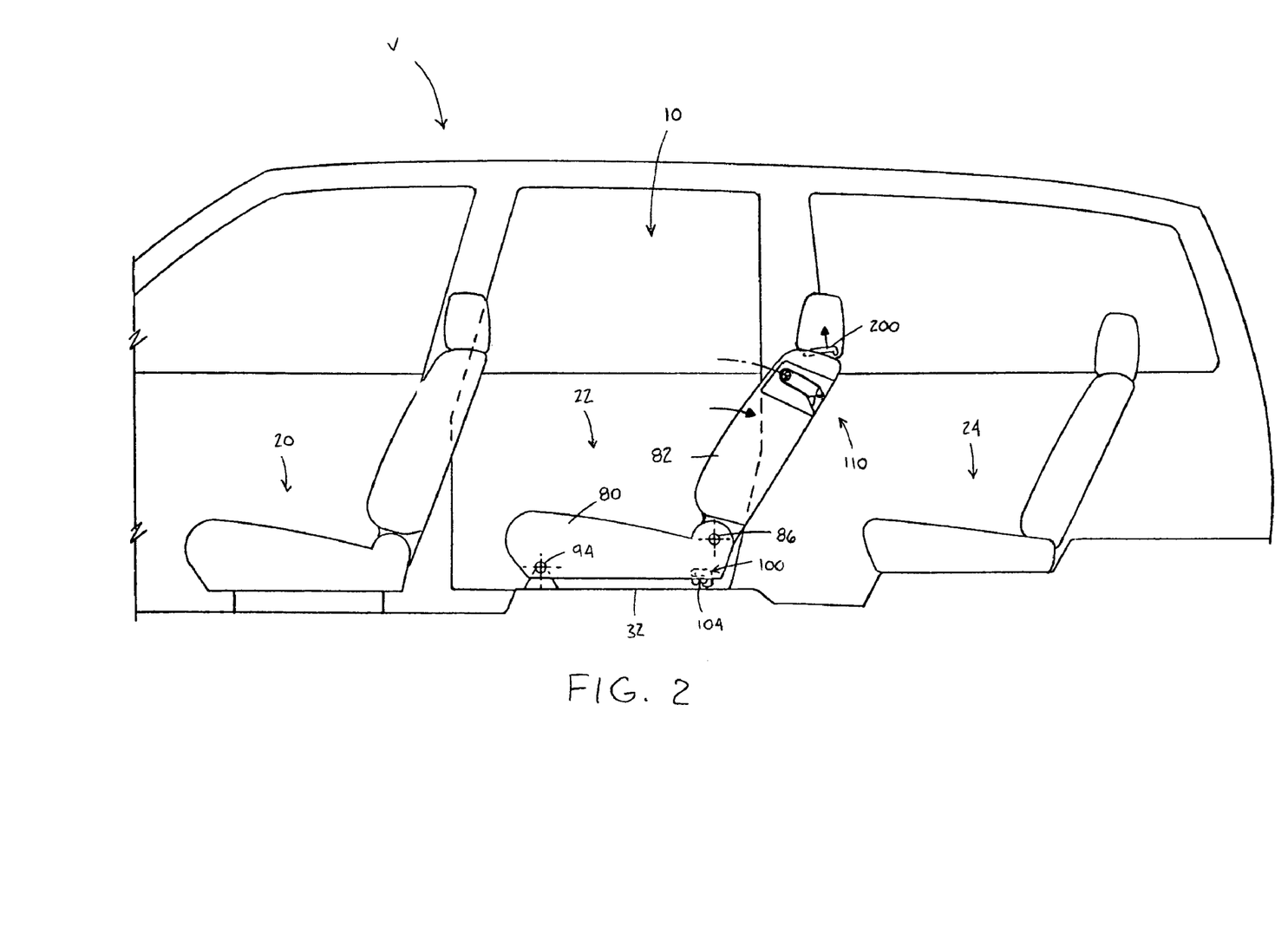
FIG. 2 schematically illustrates the second row seat of FIG. 1 in a second, recline position.
Figure 3:
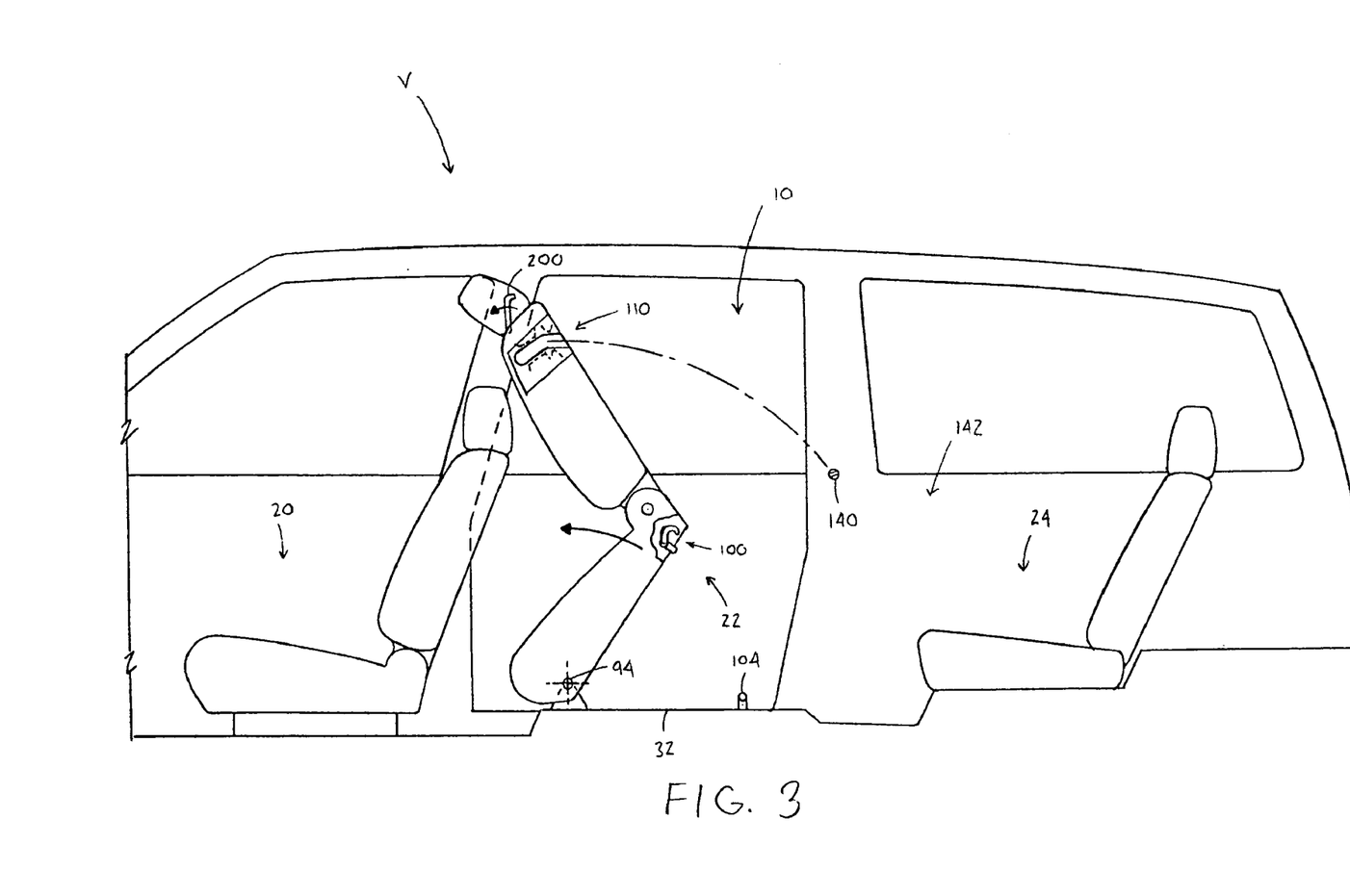
FIG. 3 schematically illustrates the second row seat of FIG. 1 being tipped or tilted in a standing position for ingress and egress to and from an area disposed behind the second row seat (e.g., a third row seat).

Referring now to the drawings wherein the showings are for purposes of illustrating one or more exemplary embodiments only and not for purposes of limiting the same, FIGS. 1-3 schematically illustrate an exemplary embodiment of a vehicle seating arrangement 10 adapted for use in connection with a vehicle V having an increased cargo and passenger carrying capacity. The vehicle seating arrangement 10 generally comprises at least one front or first row seat or seat assembly 20, at least one second row seat or seat assembly 22 and at least one rear or third row seat or seat assembly 24. The second row seat 22 and the third row seat 24 can be a split-bench/split back type seat; although, alternative seat configurations, such as bench type seats or separated captain type seats, are contemplated. Each seat 20, 22, 24 is coupled to a body 30 of the vehicle.

As shown, the vehicle body includes a floor 32 which can have a series of generally horizontally disposed platforms that are placed at various levels. These platforms include a generally horizontally disposed first platform 34, a second horizontally disposed platform 36, a third horizontally disposed platform 38, and a fourth horizontally disposed platform 40 that extends behind the third seat assembly 24. The first platform 34 can provide a surface on which the vehicle front row seat 20 can be mounted. For passengers sitting in the second row seat 22, the first platform can serve as a foot well upon which a passenger can rest his/her feet. The second platform 36 provides a surface on which the second row seat 22 can be mounted. The second platform 36 can be raised, relative to the level of the first platform 34, though this is not required. The rear portion of the second platform 36 can serve as a foot well for passengers sitting in the third row seat 24 or a recess 42 can be provided between the platforms 36, 38 for serving as a foot well. The third platform 38 is raised relative to the level of the second platform 36 (though this is not required), and provides a surface on to which the third seat 38 is anchored. The fourth platform section 40 generally defines the level of the cargo carrying floor of the vehicle. The illustrated sections 34-40 of the floor 32 are merely exemplary and thus need not be limited to what is shown herein.

The illustrated vehicle seating arrangement 10 is generally used in vehicles having one or two side mounted rear doors, in addition to the usual two front doors and possibly a tailgate member. Such vehicles can have a "B-pillar" area 50 which occupies the space between the rearward edge of the front door and the forward edge of the rear door, and a "C-pillar" area 52 which is placed adjacent to the rearward surface of the rear door, though alternate configurations are possible.

The front row seat 20 includes a seat cushion 60 for supporting a seat occupant and a seat back 62 pivotally coupled to the seat cushion. The seat cushion is connected to a support frame 64 which can be moveably mounted to the floor 32. Typically, the front seat 20 can be either a manually adjustable seat or can be provided with electric motors to provide automated adjustment and electronic control of the front seat. Similarly, the rear row seat 24 includes a seat cushion 70 for supporting a seat occupant and a seat back 72 coupled to the seat cushion. As shown, the seat cushion is directly connected to the vehicle floor 32; although this is not required. The seat back 72 can be in a fixed position relative to the seat cushion 70. Alternatively, the rear row seat 24 can include a pivoting mechanism (see FIG. 6), which can be coupled to one or both of the seat cushion 70 and seat back 72 to permit the seat back 72 to pivot between a first upright, passenger carrying position and a second, cargo carrying position.

With continued reference to FIGS. 1-3, the second row seat 22 includes a seat cushion 80 for supporting a seat occupant. A seat back 82 is pivotally coupled to the seat cushion via a pivoting mechanism 86. The seat cushion 80 is pivotally connected to the vehicle body 30. Particularly, a mounting bracket 90 is affixed to the vehicle floor 32. A pivoting mechanism 94 connects a front section 96 of a seat cushion frame (not shown) of the seat cushion 80 to the bracket 90. This pivot connection permits the second row seat 22 to tip or tilt toward the front row seat 20 about an axis defined by the pivoting mechanism (see FIG. 3). A seat latch 100 is operatively associated with a rear section 102 of the seat cushion frame in a manner known in the art. The seat latch 100 is releasably secured to a floor mounted striker 104 (not shown). Actuation of the seat latch 100 allows the pivotable movement of the second row seat 22 about the pivoting mechanism 94. It should be appreciated that the seat pivoting mechanisms can be any mechanism suitable for pivoting the seat back between an upright seating position and a recline or folded position and/or the second row seat to the ingress/egress position as is commonly known in the art.

Figure 4:
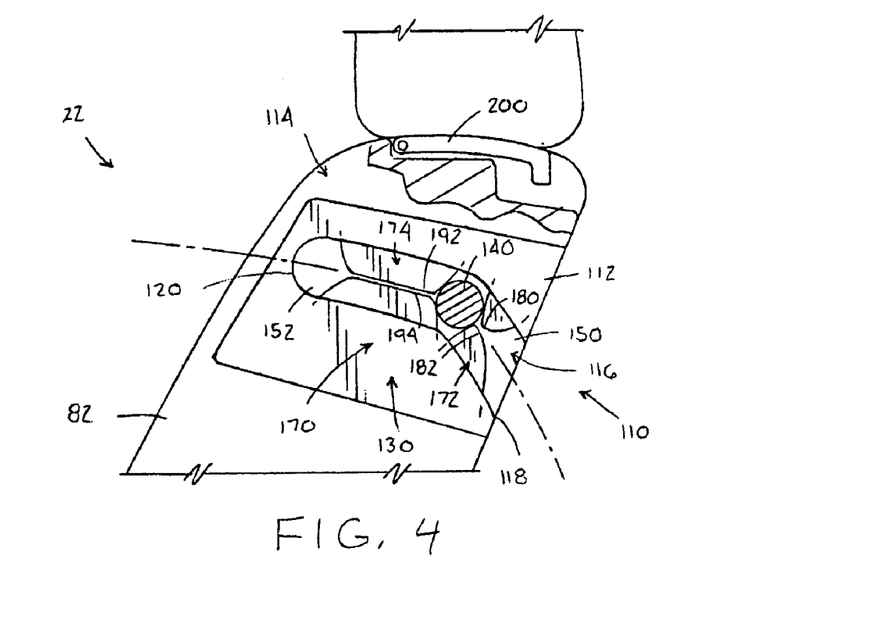
FIG. 4 schematically illustrates a high latch assembly of the vehicle seating arrangement of FIG. 1 according to one aspect, the high latch assembly being operatively associated with the second row seat and holding the same in the first position.
Figure 5:
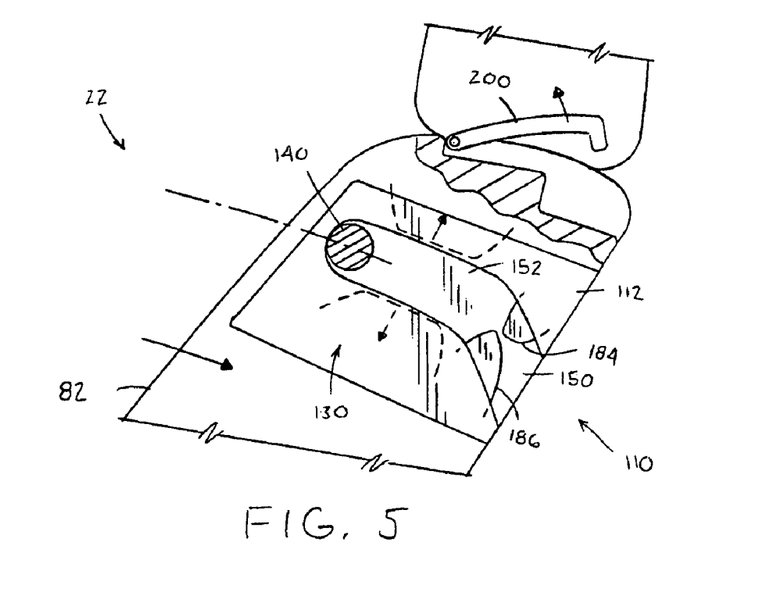
FIG. 5 schematically illustrates the high latch assembly of FIG. 4 holding the second row seat in the second, recline position.

With reference to FIGS. 4 and 5, the vehicle seating arrangement 10 further comprises a high latch assembly 110 operatively associated with the second row seat 22. High-latches can be used on vehicle seats (e.g., second row seat 22) as a lightweight and simple means of holding a rear seat back in position for occupation and selective releasing for use of a cargo area and/or ingress/egress to an area behind the seat. High-latches result in an overall lightweight seat design because the seat can rely on the vehicle body for cargo-retention strength and occupant loads in the event of a collision. The exemplary high latch assembly 110 includes a housing 112 which is secured to the seat back 82 adjacent an upper end portion 114 of the seat back. The housing includes a slot 116 formed therein having an open first end 118 and a second end 120 having generally arcuate surface. Particularly, the slot 116 is a dual-arc guide 130 configured to allow for both ingress to and egress from the third row seat 24 (i.e., an area behind the second row seat 22) and recline adjustment of the seat back 82. The dual-arc guide 130 operatively receives a striker 140, which in the depicted embodiment, has a generally cylindrical shape and is affixed to a vehicle wall 142 (see FIG. 3).

The dual-arc guide 130 includes a first generally arcuate guide portion or path 150 configured to allow the second row seat 22 to pivot forward (FIG. 3) and a second generally arcuate guide portion or path 152 configured to allow the seat back 82 to move between the upright position (FIG. 1) and the recline position (FIG. 2). As shown, the first guide portion 150 extends generally toward the vehicle floor 32 and the third seat 24 and the second guide portion 152 generally traverses the seat back 82. To move the second row seat 22 forward, the first guide portion 150 is concentric about a seat pivot (which in the exemplary embodiment is defined by the pivoting mechanism 94) at the front portion 96 of the seat cushion 80. This allows the second row seat 22 to tip or tilt for ingress and egress to and from the third row seat 24. The second guide portion 152 is concentric about a recliner center point (which in the exemplary embodiment is defined by the pivoting mechanism 86) of the second row seat. This allows for recliner adjustment of the seat back 82. Thus, the seat pivot of second arcuate guide portion 152 is offset from the seat pivot of the first arcuate guide portion 150.

Figure 7:
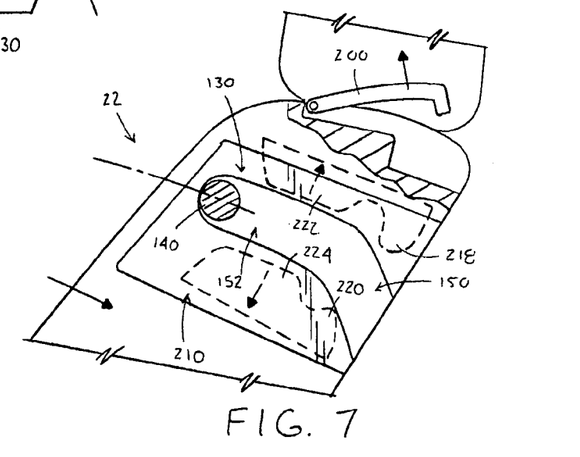
FIG. 7 schematically illustrates the high latch assembly of FIG. 6 holding the second row seat in the second, recline position.
Figure 8:
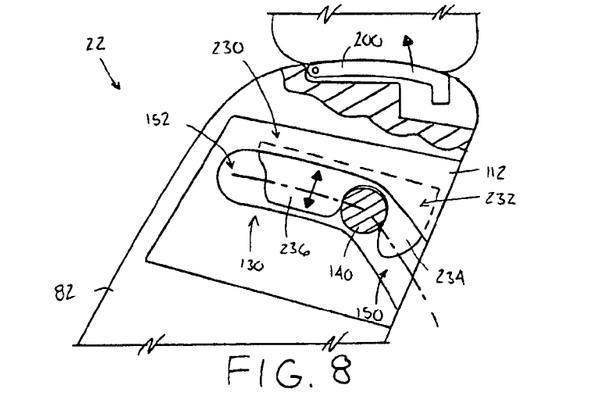
FIG. 8 schematically illustrates a high latch assembly of the vehicle seating arrangement of FIG. 1 according to yet another aspect, the high latch assembly being operatively associated with the second row seat and holding the same in the first position.

The high latch assembly further comprises one of latching mechanism 170 (FIGS. 4 and 5), latching mechanism 210 (FIGS. 6 and 7) and latching mechanism 230 (FIG. 8). Each latching mechanism is operable to selectively lock the striker 140 in a first latched position (FIGS. 1, 4, 6 and 8) and a second latched position (FIGS. 2, 5 and 7) within the second guide portion 152. In the first latch position, the seat back 82 is in a first angular position or upright position relative to the seat cushion 80 (FIG. 1). In the second latched position, the seat back 82 is in a second angular position relative to the seat cushion (FIG. 2). In the illustrated embodiment, the seat back 82 of the second row seat 22 is configured to recline only between the first angular position and the second angular position.

With reference now to FIGS. 4 and 5, the latching mechanism 170 includes a first locking device 172 and a second locking device 174. The first locking device 172 is operatively located generally between the first guide portion 150 and the second guide portion 152. The second locking device 174 is operatively located in the second guide portion 152. The striker 140 is located between the first and second locking devices 172, 174 in the first latched position, and is located between the second end 120 of the housing slot 116 and the second locking device 174 in the second latched position.

The illustrated first locking device 172 includes an upper engagement member 180 and a lower engagement member 182, the upper and lower engagement members being biased to a closed condition (e.g., by springs, not shown). Each engagement member 180, 182 is generally ramp-shaped and includes a sloped surface 184, 186 which faces the first end 118 of the housing slot 116. The shape of the engagement members 182 and 184 allows the striker 140, upon contact with the sloped surfaces, to move past the engagement members into the first latched position. Particularly, as the second row seat 22 pivots downwardly from the ingress/egress position of FIG. 3 to the upright position of FIG. 1, the striker 140 is received in the first guide portion 150. As the striker continues to move within the first guide portion, the striker contacts the sloped surfaces 184, 186 and applies a force thereto. Once this force is applied, the upper and lower engagement members 180, 182 will move into the housing 112 to an open condition, thereby allowing the striker 140 to move past the first locking device 172. The upper and lower engagement members 182, 184 are then biased back into the closed condition. Further movement of the striker within the dual-arc guide 130 is prevented by the second locking device 174.

Similarly, the second locking device 174 includes an upper engagement member 190 and a lower engagement member 192. The upper and lower engagement members are configured to move between a closed condition (FIG. 4) and an open condition (FIG. 5). This allows the striker 140 to move from the first latched position to the second latched position. To actuate the latching mechanism 170, a lever 200 is operatively connected to the latching mechanism for moving each of the first and second locking devices 172, 174 of the latching mechanism from the closed condition to the open condition. As shown, the lever 200 is located on the seat back 82 of the second row seat 22; although, this is not required. In operation, the lever is movable from a rest position (FIG. 4) to a first position (FIG. 5) wherein the upper and lower engagement members 192, 194 move to the open condition. This allows the striker 140 to move within the second guide portion 152 to the second latched position and the seat back 82 to the recline position. The lever 200 is also movable from the first position to a second position (FIG. 3). In the second position, the upper and lower engagement members 180, 182 are in the open condition. This allows the striker 140 to move through the first guide portion 150 so that the second row seat 22 can pivot toward the front row seat 20, thereby allowing for ingress to and egress from the third row seat 24.

Figure 6:
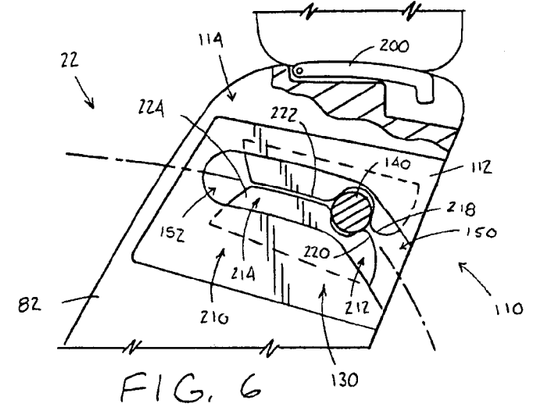
FIG. 6 schematically illustrates a high latch assembly of the vehicle seating arrangement of FIG. 1 according to another aspect, the high latch assembly being operatively associated with the second row seat and holding the same in the first position.

With reference to FIGS. 6 and 7, the latching mechanism 210 includes a first locking device 212 and a second locking device 214. The first locking device 212 includes an upper engagement member 218 and a lower engagement member 220. The second locking device 214 includes an upper engagement member 222 and a lower engagement member 224. In this exemplary embodiment, the upper engagement members 218 and 222 together form a unitary member and the lower engagement members 220 and 224 together form a unitary member. Similar to the previous embodiment, to actuate the latching mechanism 210, the lever 200 is operatively connected to the latching mechanism for moving each of the first and second locking devices 212, 214 from the closed condition (FIG. 6) to the open condition (FIG. 7). This allows the striker 140 to move from the first latched position (FIG. 6) to one of the second latched position (FIG. 7) and completely out of the dual-arc guide 130.

As shown in FIG. 8, the latching mechanism 230 includes a single locking device 232. The locking device includes a first engagement member 234 and a second engagement member 236, which together form a unitary member. The locking device is sufficiently sized such that in the closed condition (FIG. 8), the first and second engagement members prevent the striker 140 from moving through the dual-arc guide 130. To actuate the latching mechanism 210, the lever 200 is operatively connected to the latching mechanism for moving the locking device 232 from the closed condition to the open condition (not shown). This allows the striker 140 to move from the first latched position to one of the second latched position and completely out of the dual-arc guide 130.

Figure 10:
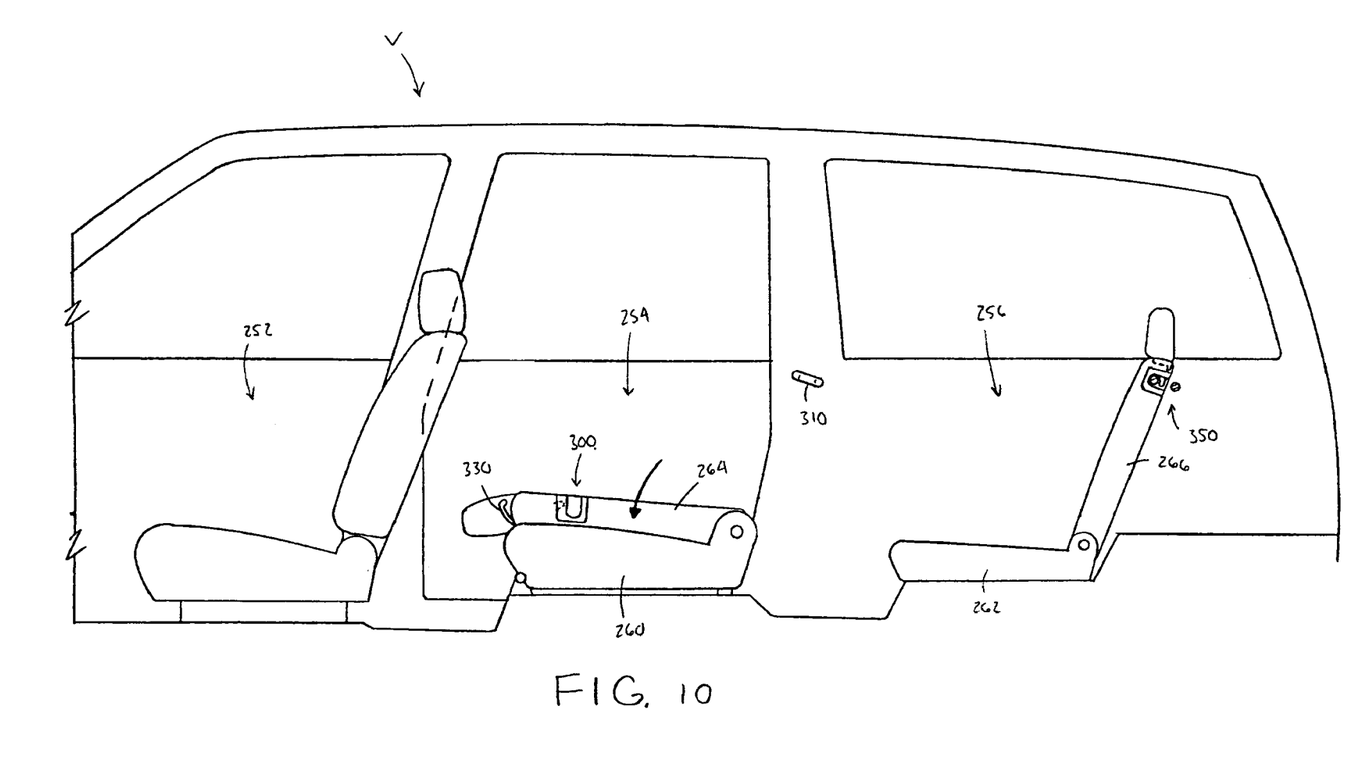
FIG. 10 schematically illustrates the second row seat of FIG. 9 in a second, cargo carrying position.
Figure 11:
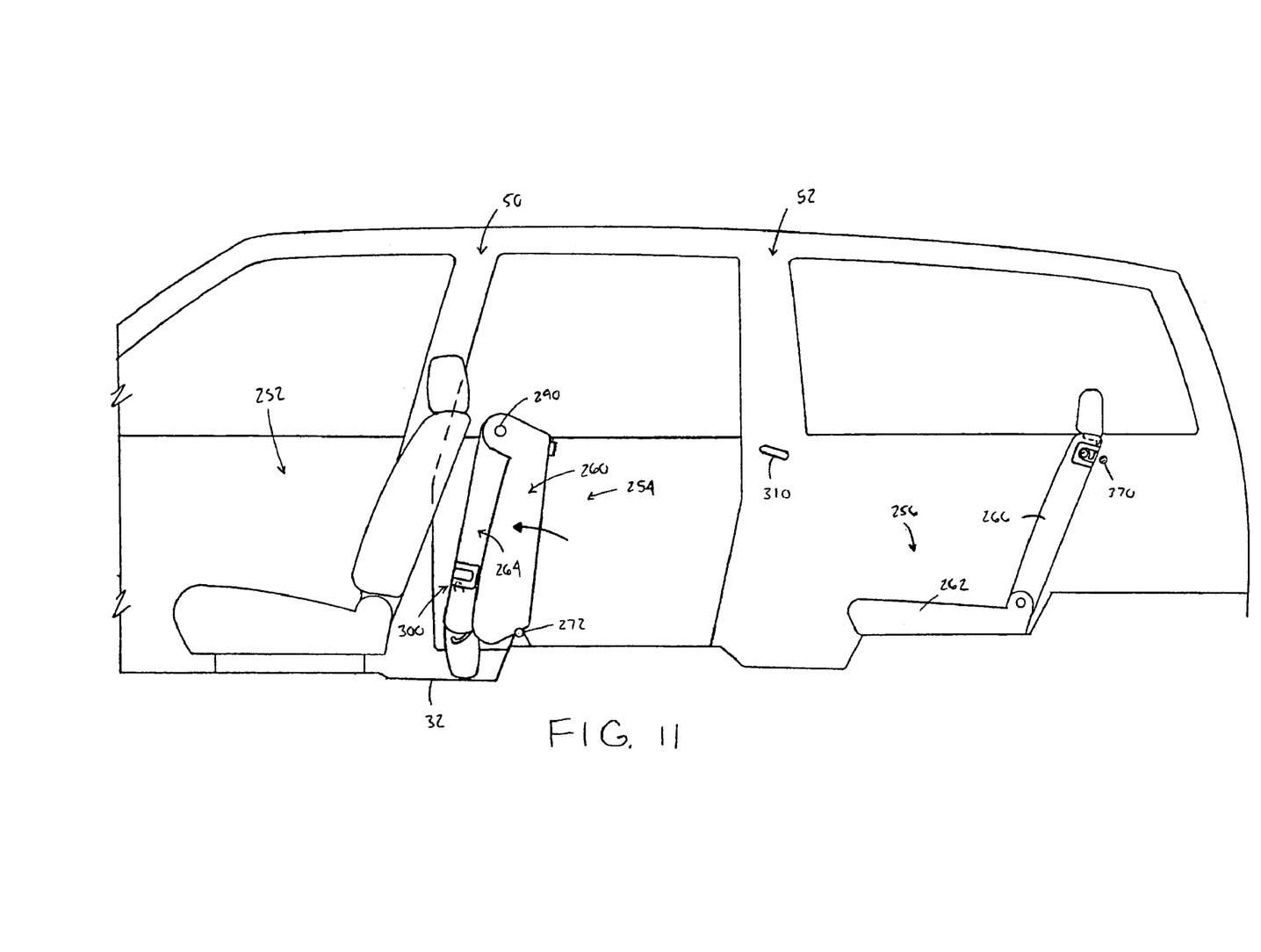
FIG. 11 schematically illustrates the second row seat of FIG. 9 in a fold-and-tumble position for ingress and egress to and from an area disposed behind the second row seat (e.g., the third row seat).
Figure 12:
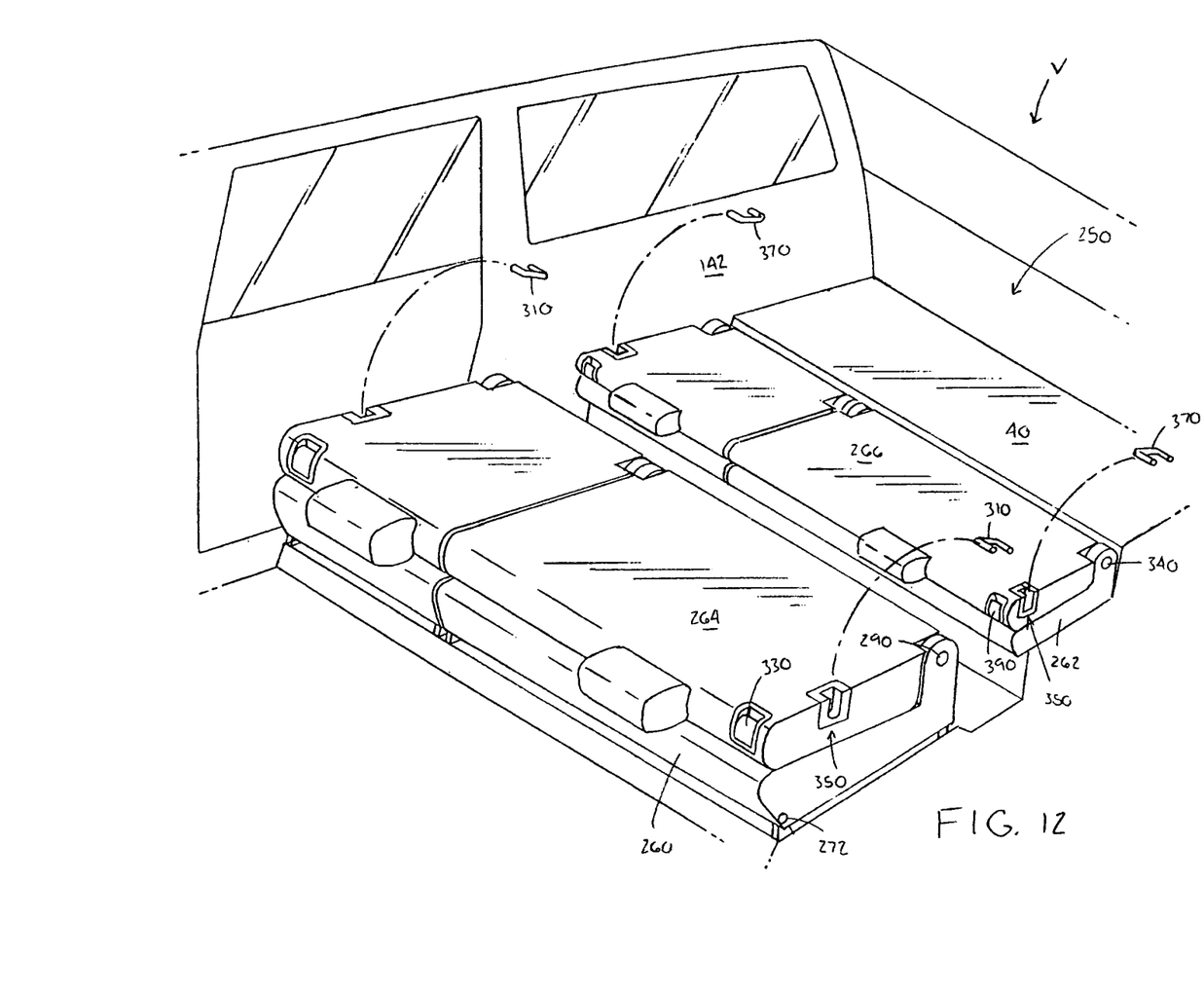
FIG. 12 is a partial perspective view of the second and third row seats of FIG. 9 in their respective second, cargo carrying position.

With reference now to FIGS. 9-12, another exemplary embodiment of a vehicle seating arrangement 250 adapted for use in connection with the vehicle V is schematically illustrated. Similar to the previous embodiment, the vehicle seating arrangement 250 generally comprises at least one front or first row seat 252, at least one second row seat 254 and at least one rear or third row seat 256. Each seat is coupled to the body 30 of the vehicle. The front row seat 252 is structurally similar to front row seat 20, therefore, no further discussion is provided herein. Each of the second row seat 254 and the rear row seat 256 includes a respective seat cushion 260, 262 for supporting a seat occupant and a respective seat back 264, 266 pivotally coupled to the seat cushion. As shown in FIG. 12, the second row seat and the third row seat can be a split-bench/split back type seat; although, alternative seat configurations, such as bench type seats or separated captain type seats, are contemplated.

Figure 9:
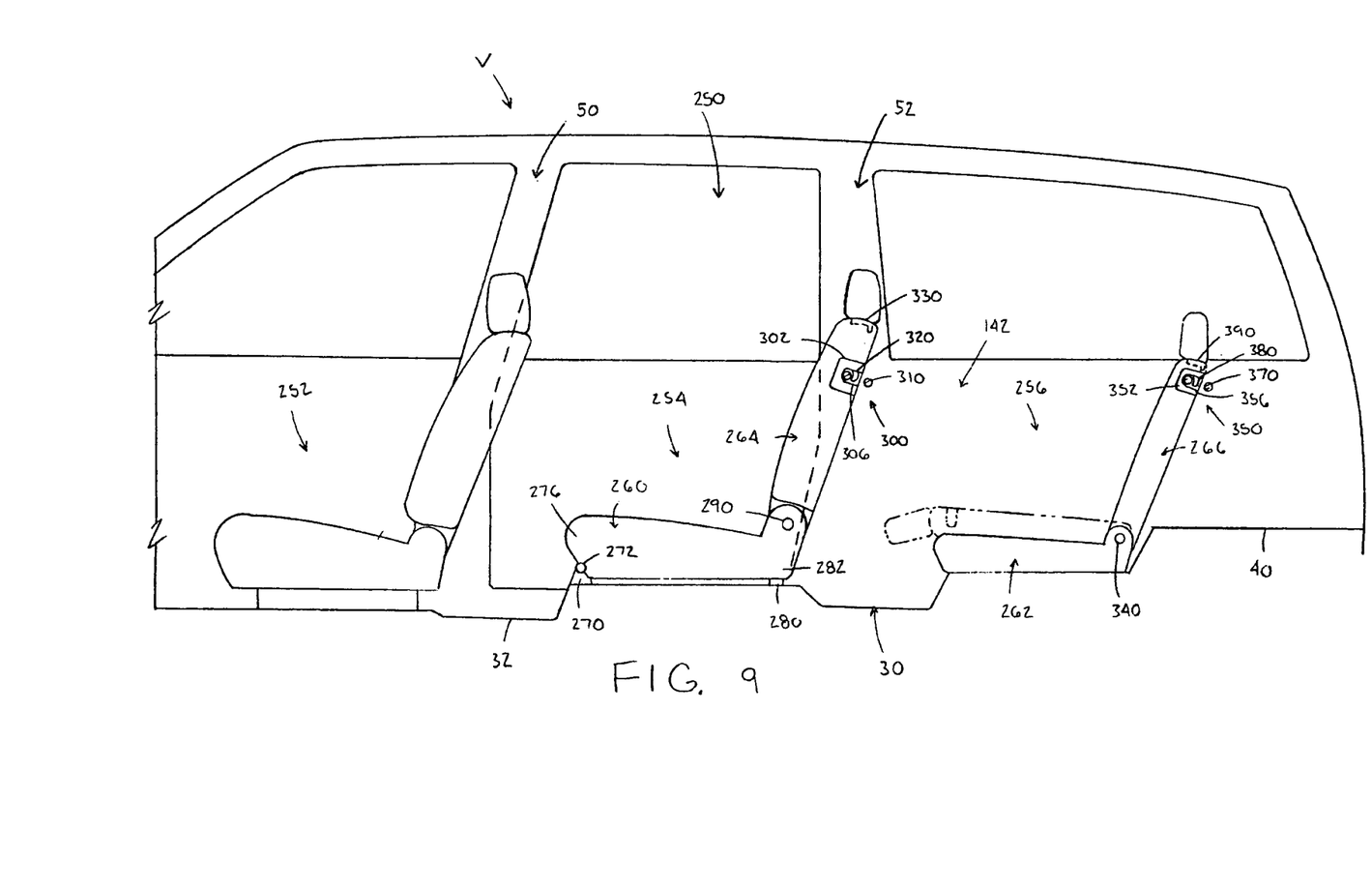
FIG. 9 illustrates another exemplary embodiment of a vehicle seating arrangement including a second row seat and a third row seat, both shown in a first, upright position.

As shown in FIG. 9, it will be noted that when the second row seat 254 is in its upright, passenger carrying position, access to the third row seat 256 through the rear doors of the vehicle is obstructed by the second row seat and the C-pillar 52. The second row seat 254 can employ a fold-and-tumble design that allows the seat back 264 to be folded down on the seat cushion 260 of the second row seat 254 and then both the seat back and the seat cushion can be pivoted forwardly in the vehicle to allow for both ingress to and egress from the third row seat 256. The seat cushion 260 is pivotally connected to the vehicle body 30 via a mounting bracket 270 which is affixed to the vehicle floor 32. A pivoting mechanism 272 connects a front section 276 of a seat cushion frame (not shown) of the seat cushion 260 to the bracket 270. This pivot connection permits the second row seat to tip or tilt toward the front seat 252 about an axis defined by the pivoting mechanism (see FIG. 11). A seat latch 280 can be releasably secured to a rear section 282 of the seat cushion frame in a manner known in the art. Alternatively, the seat latch 100 can be affixed to or formed as part of the rear section 282 and releasably secured to a floor mounted striker (not shown). The seat back 264 is pivotally coupled to the seat cushion 260 via a pivoting mechanism 290.

The vehicle seating arrangement 250 further comprises a first high latch assembly 300 operatively associated with the second row seat 254. The exemplary first high latch assembly includes a housing 302 which is secured to the seat back 264 adjacent an upper end portion of the seat back. The housing includes a slot 306 formed therein which is configured to operatively receives a first striker 310. In the depicted embodiment, the first striker is U-shaped and is affixed to a vehicle wall 142 (see FIG. 12). It should be appreciated that the seat back 264 can include the first striker 310 and the vehicle body can include the first high latch assembly 300. The high latch assembly 300 further comprises a latching mechanism 320. The latching mechanism is operable to selectively lock the first striker 310 in a latched position (FIG. 9) wherein the seat back 264 is in an upright position relative to the seat cushion 260. To actuate the latching mechanism 320, a lever 330 is operatively connected to the latching mechanism for moving the latching mechanism from a closed condition (FIG. 9) to an open condition (FIG. 10). As shown, the lever 330 is located on the seat back 264 of the second row seat 254; although, this is not required.

With continued reference to FIG. 9, the seat cushion 262 of the third row seat 256 is directly connected to the vehicle floor 32; although this is not required. The seat back 266 is pivotally coupled to the seat cushion 262 via a pivoting mechanism 340, which permits the seat back to pivot between a first upright, passenger carrying position (FIG. 10) and a second, cargo carrying position (FIG. 12). A second high latch assembly 350 is operatively associated with the third row seat 256. The exemplary second high latch assembly includes a housing 352 which is secured to the seat back 266 adjacent an upper end portion of the seat back. The housing includes a slot 356 formed therein which is configured to operatively receive a second striker 370. Again, it should be appreciated that the seat back 266 can include the second striker 370 and the vehicle body can include the second high latch assembly 350. Similar to the first striker 310, the second striker can be U-shaped and is affixed to a vehicle wall 142 (see FIG. 12). The high latch assembly further comprises a latching mechanism 380. The latching mechanism is operable to selectively lock the second striker 370 in a latched position wherein the seat back 266 is in an upright position relative to the seat cushion 260. To actuate the latching mechanism 380, a lever 390 is operatively connected to the latching mechanism for moving the latching mechanism from a closed condition to an open condition.

The operation of the vehicle seating arrangement 250 will now be described with reference to FIGS. 9-11. Turning first to FIG. 9, the second row seat 254 and the third row seat 256 are shown in their upright, passenger carrying configuration. For maintaining the second row seat and third row seat in the upright position, the first and second high latch assemblies 300 and 350 fixedly couple the respective seat backs 264 and 266 to the first and second strikers 310 and 370. Because the vehicle door opening for the second row seat 254 is positioned generally between the B-pillar 50 and the C-pillar 52, passengers can gain easy access to the second row seat 254. However, ingress and egress from the third row seat 256 cannot be accomplished without some difficulty, such as by climbing over the second row seat.

To enable a passenger to gain ingress to the third row seat 256 (or to allow a passenger to egress from the third row seat 256), the first high latch assembly 300 can be actuated to move the seat back 264 into its passenger access configuration. In order to move the seat back 264, the lever 330 is lifted, which, in turn, actuates the first high latch assembly to release the latch connection between the seat back 264 and the first striker 310. As shown in FIG. 10, this permits the seat back 264 to fold forwardly to a cargo carrying position wherein the seat cushion 260 and the seat back 264 are disposed generally parallel to each other, and also generally parallel to the vehicle floor 32. The seat latch 280 is then actuated to permit the seat cushion 260 to pivot about an axis defined by the pivoting mechanism 272. This allows both the seat cushion 260 and the seat back 264 to move into a pivoted or fold-and-tumble position, shown in FIG. 11. In this position, the seat cushion 260 and seat back 264 are disposed generally parallel to each other, and also generally perpendicular to the vehicle floor 32. As shown in FIG. 11, when the second row seat 254 is placed in the fold-and-tumble position, the second row seat and door opening (which is generally between the B-pillar 50 and the C-pillar 52) are positioned to permit easy ingress to and egress from the third row seat 256.

Turning now to FIG. 9, the rear row seat 256 is moveable between an upright or passenger carrying position (as shown in solid) wherein the seat back 266 is secured to the second striker 370 via the second high latch assembly 350; and to a cargo carrying position (shown in phantom) wherein the seat cushion 262 and the seat back 266 are disposed generally parallel, and almost co-planar with the fourth platform section 40 of the floor 32. In order to move the seat back 266, the lever 390 is lifted, which, in turn, actuates the second high latch assembly to release the latch connection between the seat back 266 and the second striker 370. This permits the seat back to fold forwardly about an axis defined by the pivoting mechanism 340 to the cargo carrying position. As shown in FIG. 12, when the second and third row seats 254, 256 are each placed in their cargo carrying position, a generally planer, cargo carrying surface is formed. This generally planer cargo surface permits the vehicle to carry a large amount of cargo.

Employing the high latch feature to both the second and third row of seats provides a weight savings because the seat structure is able to rely on the vehicle body for strength and vice versa. This is instead of an independent system that must rely on its own strength in collision situations. In addition to the high latch feature, the second row of seats can employ the above-described fold-and-tumble design that allows the seat back to be folded down on the seat cushion of the seat and then both the seat back and the seat cushion to be pivoted forwardly in the vehicle to better enable access to the third row of seats.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle seating arrangement adapted for use in connection with a vehicle having an increased cargo and/or passenger carrying capacity, the vehicle seating arrangement comprising:
    at least one front or first row seat assembly coupled to a vehicle body;
    at least one second row seat assembly, the at least one second row seat assembly including a seat cushion for supporting a seat occupant, the seat cushion being pivotally coupled to the vehicle body, and a seat back pivotally coupled to the seat cushion;
    at least one rear or third row seat assembly coupled to the vehicle body; and
    a high latch assembly operatively associated with the at least one second row seat assembly, the high latch assembly including a housing having a dual-arc guide including a first guide portion and a second guide portion, wherein the first guide portion is concentric about a seat pivot at a front portion of the seat cushion allowing the second row seat assembly to tip or tilt for ingress and egress to and from the third row seat assembly.

2. The vehicle seating arrangement of claim 1, wherein the dual-arc guide is located on the seat back, and further including a striker affixed to a vehicle wall, the striker being operatively received within the dual-arc guide.

3. The vehicle seating arrangement of claim 1, wherein the second guide portion is concentric about a recliner center point of the second row seat assembly allowing for recliner adjustment of the seat back.

4. The vehicle seating arrangement of claim 1, wherein the high latch assembly comprises a latching mechanism, the latching mechanism operable to selectively lock the striker in a first latched position within the second guide portion wherein the seat back is in a first angular position relative to the seat cushion, and selectively lock the striker in a second latched position within the second guide portion wherein the seat back is in a second angular position relative to the seat cushion.

5. The vehicle seating arrangement of claim 4, wherein the latching mechanism includes a first locking device and a second locking device, the striker being located between the first and second locking devices in the first latched position, the striker being located between the housing and the second locking device in the second latched position.

6. The vehicle seating arrangement of claim 5, wherein the first locking device is operatively located between the first guide portion and the second guide portion.

7. The vehicle seating arrangement of claim 4, wherein the high latch assembly further includes a lever operatively connected to the latching mechanism for moving the latching mechanism from a closed condition to an open condition, the lever being located on the seat back.

8. A vehicle seat comprising:
    a seat cushion;
    a pivoting mechanism for pivotally coupling the seat cushion to an associated vehicle floor;
    a seat back pivotally coupled to the seat cushion;
    a high latch assembly including a housing secured to the seat back adjacent an upper end portion of the seat back, the housing including a slot being a dual-arc guide including a first guide portion and a second guide portion, the first guide portion being concentric about a seat pivot defined by the pivoting mechanism.

9. The vehicle seat of claim 8, wherein the second guide portion is concentric about a recliner center point.

10. The vehicle seat of claim 9, wherein seat back pivots with respect to the seat cushion about the recliner center point.

11. The vehicle seat of claim 8, further comprising a seat latch for releasably securing to an associated floor mounted striker, wherein actuation of the seat latch allows for pivotable movement of the vehicle seat about the pivoting mechanism.

12. The vehicle seat of claim 11, wherein the pivoting mechanism is located adjacent a front portion of the seat cushion.

13. The vehicle seat of claim 8, wherein the high latch assembly includes a latching mechanism operable to selectively lock an associated striker in a first latched position and a second latched position.

14. The vehicle seat of claim 13, wherein in the first latched position the seat back is in a first angular position relative to the seat cushion and in the second latched position the seat back is in a second angular position relative to the seat cushion.

15. A vehicle seat comprising:
    a seat cushion;
    a pivoting mechanism for pivotally coupling the seat cushion to an associated vehicle floor;
    a seat back pivotally coupled to the seat cushion and moveable between an upright position and a folded position;
    a high latch assembly including a housing secured to the seat back adjacent an upper end portion of the seat back and a latching mechanism operable to selectively lock an associated striker in a latched position, the housing including a slot being a dual-arc guide configured to receive the associated striker and including a first guide portion and a second guide portion, the first guide portion being configured to allow the vehicle seat to tip or tilt about the pivoting mechanism while the seat back is in the upright position and the latching mechanism in an open condition.

16. The vehicle seat of claim 15, further comprising a seat latch for releasably securing to an associated floor mounted striker, wherein actuation of the seat latch allows for pivotable movement of the vehicle seat about the pivoting mechanism.

17. The vehicle seat of claim 16, wherein the pivoting mechanism is located adjacent a front portion of the seat cushion.

18. The vehicle seat of claim 17, wherein the latching mechanism is operable to selectively lock the associated striker in a first latched position and a second latched position.

19. The vehicle seat of claim 18, wherein in the first latched position the seat back is in a first angular position relative to the seat cushion and in the second latched position the seat back is in a second angular position relative to the seat cushion.

20. The vehicle seat of claim 19, wherein the second guide portion is concentric about a recliner center point, and the seat back pivots with respect to the seat cushion about the recliner center point.

* * * * *